United States Patent [19]

Simon Bacardit

[11] Patent Number: 4,582,086

[45] Date of Patent: Apr. 15, 1986

[54] ROTARY HYDRAULIC DISTRIBUTOR, PARTICULARLY FOR POWER STEERING SYSTEMS FOR VEHICLES

[75] Inventor: Juan Simon Bacardit, Barcelona, Spain

[73] Assignee: Bendiberica S.A., Barcelona, Spain

[21] Appl. No.: 602,855

[22] Filed: Apr. 23, 1984

[30] Foreign Application Priority Data

Apr. 26, 1983 [ES] Spain .................................... 522.189

[51] Int. Cl.[4] ..................... F16K 11/02; F16K 9/10; B62D 5/083
[52] U.S. Cl. ........................... 137/625.21; 91/375 A; 180/142; 180/141
[58] Field of Search ........... 137/625.2, 625.21, 625.22, 137/625.23, 625.24; 91/375 R; 464/77, 24; 180/141, 142, 143; 267/150

[56] References Cited

U.S. PATENT DOCUMENTS

| | | | |
|---|---|---|---|
| 3,833,081 | 9/1974 | Suzuki | 180/143 |
| 4,428,399 | 1/1984 | Masuda et al. | 91/375 R X |
| 4,449,601 | 5/1984 | Adams | 137/625.24 X |
| 4,458,580 | 8/1984 | Masuda et al. | 91/375 R |
| 4,487,225 | 12/1984 | Adams | 91/375 R X |
| 4,488,475 | 12/1984 | Masuda et al. | 137/625.21 X |
| 4,489,755 | 12/1984 | Adams | 137/625.22 |

FOREIGN PATENT DOCUMENTS 2032361 5/1980 United Kingdom ........... 137/625.47

Primary Examiner—Martin P. Schwadron
Assistant Examiner—John S. Starsiak, Jr.
Attorney, Agent, or Firm—Larry J. Palguta; Ken C. Decker

[57] ABSTRACT

The distributor comprises a primary member, a secondary member coaxial with the primary member and having a part (3') at least partially surrounding a part (2') of the primary member, a distribution valve coupled to the primary member, and at least one deformable resilient device (4) having at least one pair of abutment surfaces (5) cooperating with the first (20) and second connection members connected to the primary and secondary members in order to hold them in a relative centered position of rest, the resilient device (4) being mounted so as to be sealingly slidable by opposite annular side faces in an annular cavity (32) formed in a member rotationally fixed to the secondary member and shaped to define in that cavity an internal chamber (6) and an external chamber (7), which are separate and whose volumes are inversely variable, means (8) being provided to direct a fluid under modulable pressure into at least one of these chambers.

14 Claims, 20 Drawing Figures

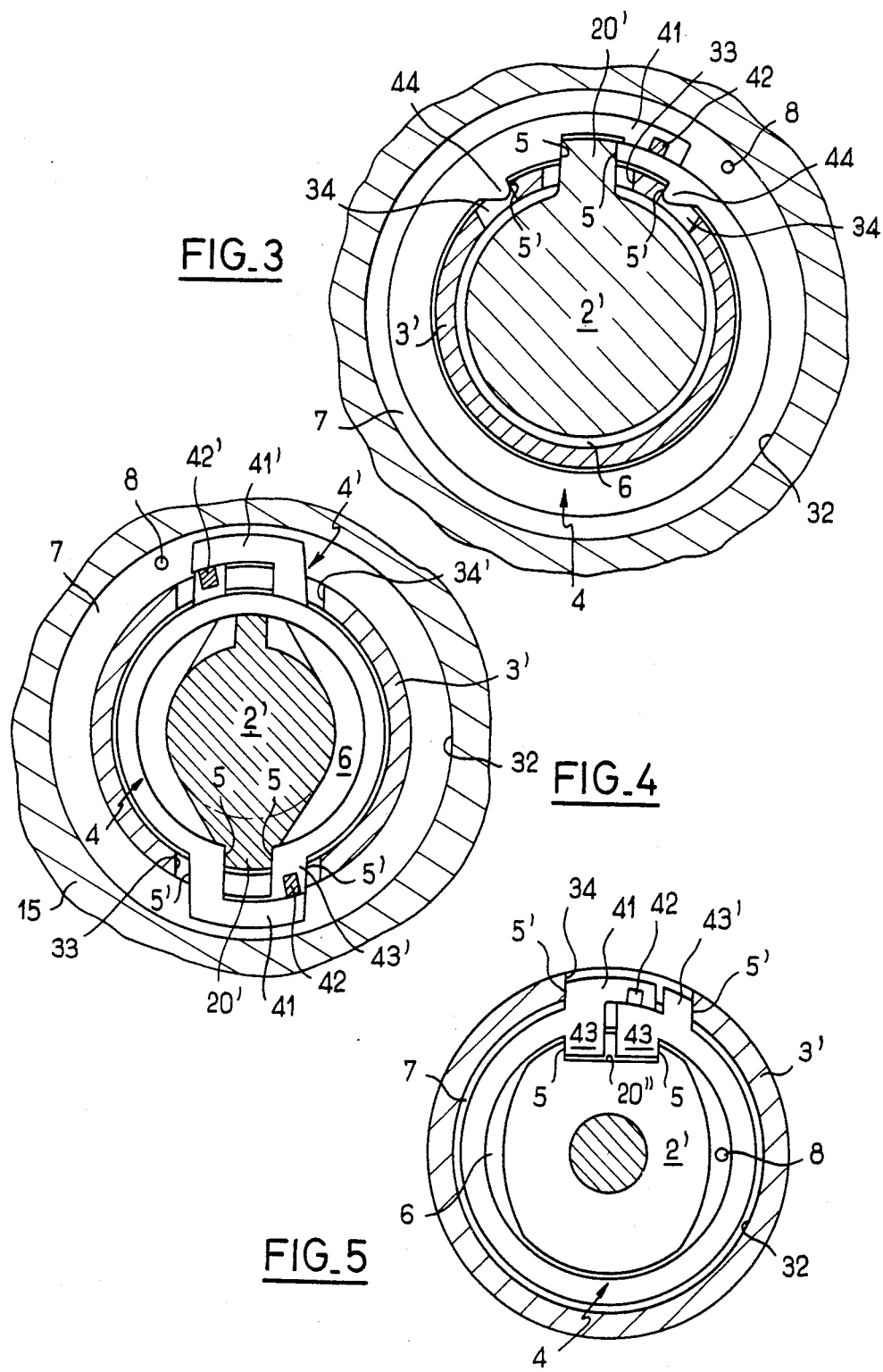

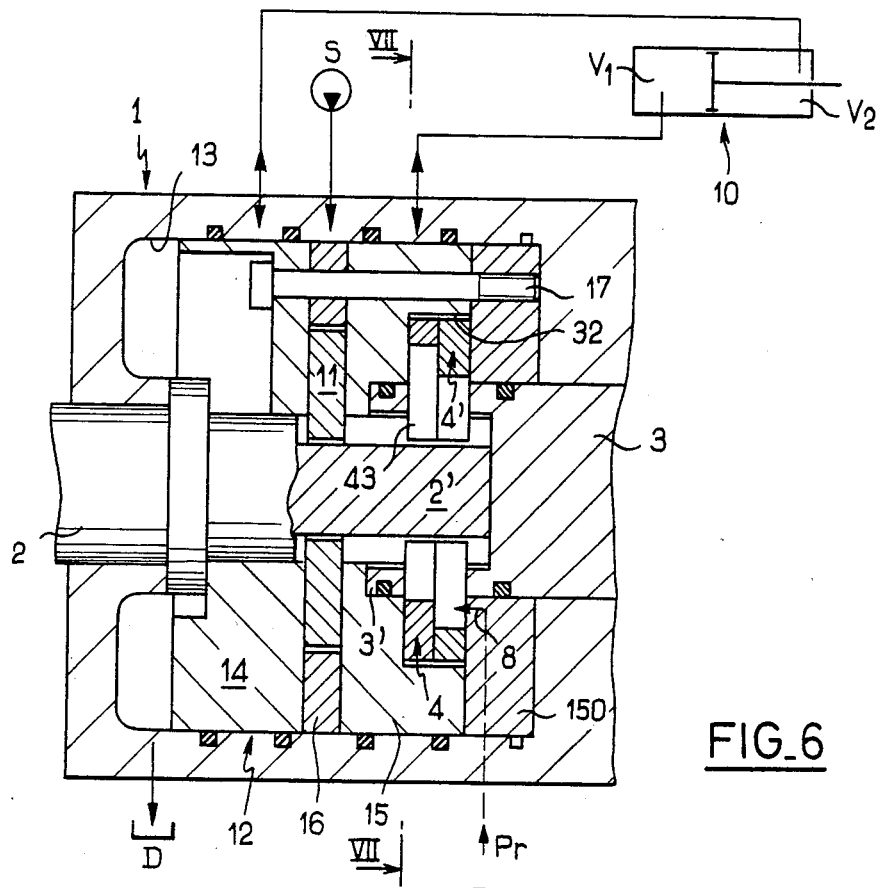
FIG_6
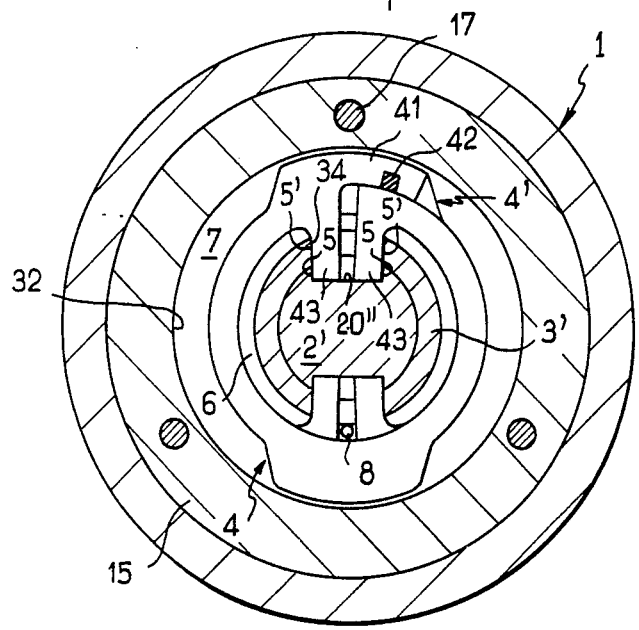
FIG_7

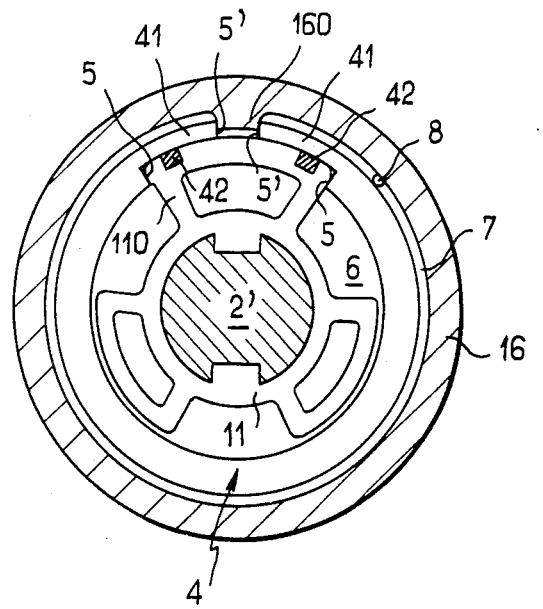
FIG_8
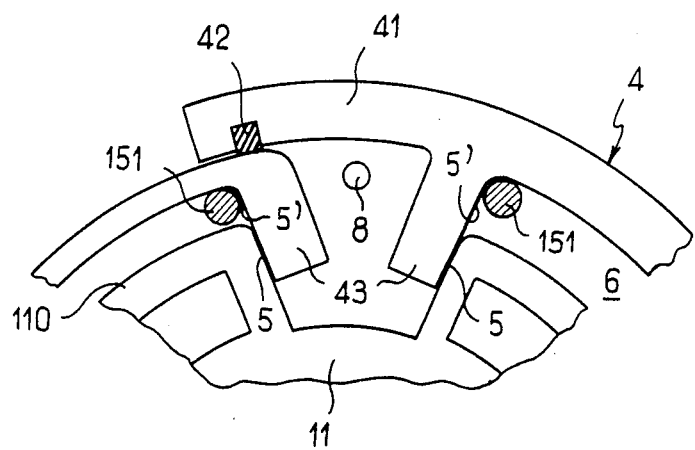
FIG_9

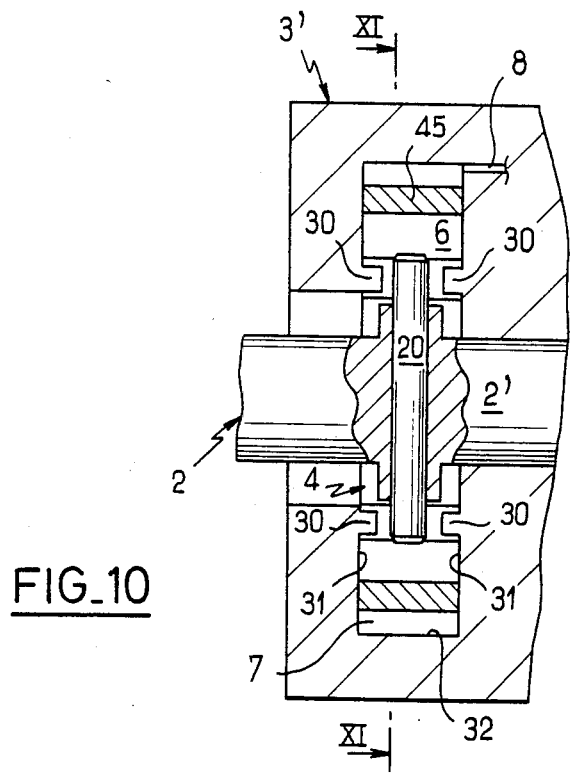
FIG_10
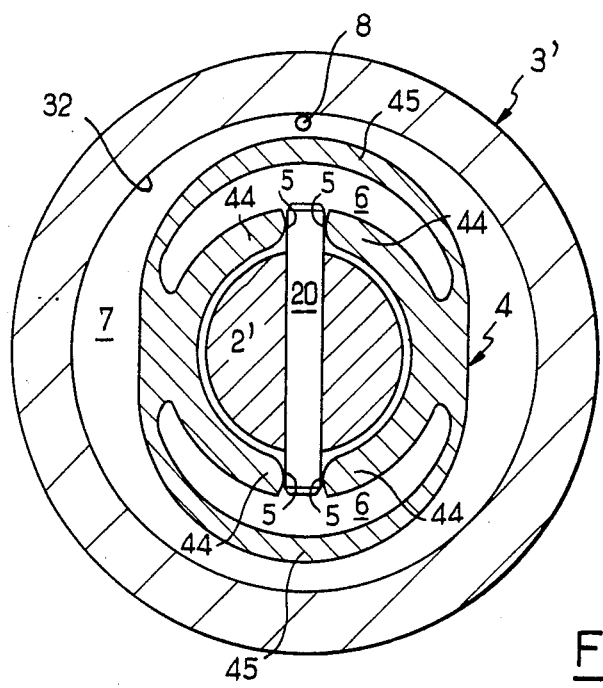
FIG_11

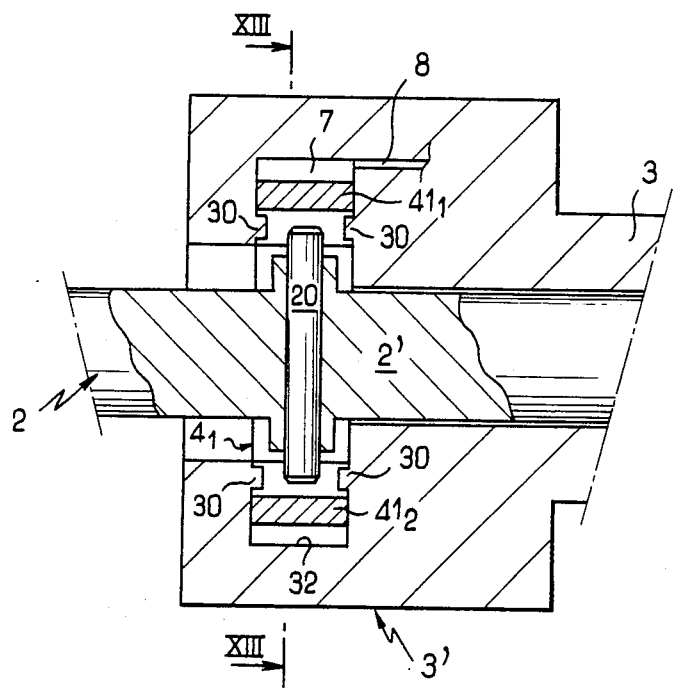
FIG_12
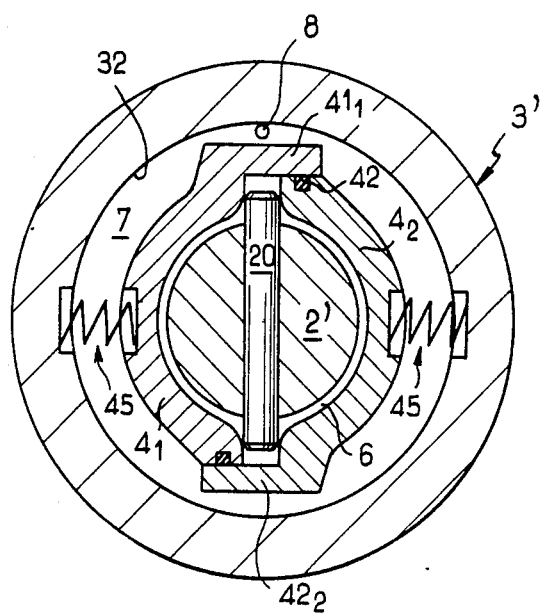
FIG_13

ROTARY HYDRAULIC DISTRIBUTOR, PARTICULARLY FOR POWER STEERING SYSTEMS FOR VEHICLES

The present invention relates to rotary hydraulic distributors, more particularly for power steering systems for vehicles, of the type comprising a primary rotary member intended to be connected to an operating device (typically a steering wheel of the vehicle), a secondary rotary member coaxial with the primary rotary member and intended to be connected to a driven mechanism (typically a mechanism controlling the direction of steered wheels), a valve means coupled to the primary member and intended to control a hydraulic power assistance motor of the driven mechanism in dependence on a limited relative angular displacement between the primary and secondary members, a part of the secondary member at least partially surrounding a part of the primary member, and at least one deformable resilient device having a substantially closed annular general configuration, surrounding at least the primary member at the said part of latter which is surrounded by the secondary member, and having at least the pair of abutment surfaces cooperating with the first and second connection members connected respectively to the primary and secondary members in order to hold them in the relative centered position of rest.

A hydraulic distributor of this type forms the subject of U.S. application Ser. No. 06/678,735 in the name of the Applicant, the contents of which are assumed to be integrated herein for reference, and which describes the utilization, as the resilient device, of at least one C-shaped spring effecting efficient centering of the primary and secondary members in the position of rest, while permitting a flexible backlash coupling between these members and in addition providing on the primary member a desirable resilient reaction, particularly for providing a sensation of "feel" during the operation of this primary member.

Nevertheless, in the system described in this document, the prestress, and consequently the reaction supplied by the C-shaped spring, are determined once and for all by the dimensioning of the spring and/or of the associated connection members.

Now, it is frequently found desirable to be able to modulate a reaction of this kind, particularly for power steering systems, in dependence on the running conditions of the vehicle, such as running straight ahead, cornering, or maneuvering for parking purposes.

It is known for such modulations of the reaction to be effected by hydraulic means. The West German Disclosure Publication (Auslegeschrift) 1,014,444 thus describes the replacement of helicoidal reaction springs by the use of two pistons mounted in opposition in the stator of the valve means and operated to create an antagonistic torque on the input shaft, these pistons being connected to the supply circuits of the power assistance motor with the aid of a delicate arrangement which is difficult to balance and is not modulable. U.S. Pat. Nos. 4,310,024 and 4,512,238 in the name of the Applicant, moreover, describe the use of controlled reaction pressures which, in order to create antagonistic torques on the primary or distributor input member, are applied to portions of the rotor of the valve means, which in the present instance is of the so-called "star" type, in particularly flexible, polyvalent arrangements, which are, however, rather difficult to manufacture.

The object of the present invention is to propose a hydraulic distributor of the type first defined above, which is of particularly simple design, is easily manufactured and installed, has a compact configuration, and which, with an extremely small number of components, makes it possible to achieve simultaneously resilient centering, a likewise resilient reaction, which is however modulable by internal or external means, and also, for a power steering mechanism, the likewise modulable determination of a hydraulic center (or initial reaction) point.

In order to do this, according to one characteristic of the invention, the resilient device is mounted so as to be sealingly slidable by its opposite annular side faces in an annular cavity formed in a member rotationally fixed to the secondary member, concentrically to the latter, and is shaped so as to define in that cavity an internal chamber and an external chamber which are separate and whose volumes are inversely variable, while in addition the resilient device comprises means for guiding a fluid under modulable pressure into at least one of these chambers.

In an arrangement of this kind, in addition to the intrinsic resilient functions of the resilient device, the application of a determined pressure in the internal chamber or in the external chamber, depending on whether it is desired to tend to "open" or "close" the annular resilient device, makes it possible to modulate the reaction exerted by the latter. It is thus possible, in accordance with the aims of the invention, to achieve a modulable prestress of the centre point of the distributor without requiring the displacement of the valve means, and, by subjecting the operating pressure to control by the conditions of utilization of the distributor, in addition to modulate independently the sloping portion or portions of the characteristic of power assistance pressure supplied plotted against distributor input torque, so that this arrangement offers great versatility and remarkable flexibility of use.

Other characteristics and advantages of the present invention will emerge from the following description of embodiments given by way of illustration, but without in any way constituting limitations, and with reference to the accompanying drawings, in which:

FIGS. 3, 4 and 5 are diagrammatical cross-sectional views similar to FIG. 2, showing second, third and fourth embodiments of the reaction and centering device;

FIG. 6 is a diagrammatical view in longitudinal section of part of a hydraulic distributor according to the invention;

FIG. 7 is a cross-section of view in the sectional plane VII—VII in FIG. 6, showing a fifth embodiment of the resilient reaction and centering device according to the invention;

FIG. 8 is a similar view to FIGS. 3 to 5 and 7, showing a sixth embodiment of the resilient reaction and centering device according to the invention;

FIG. 9 is a partial view similar to FIG. 8, showing a modified embodiment of the resilient reaction and centering device shown in FIG. 8;

FIGS. 10 and 11 are similar views to FIGS. 1 and 2, showing an eighth embodiment of the resilient reaction and centering device according to the invention;

FIGS. 12 and 13 are similar views to FIGS. 10 and 11, showing a ninth embodiment of the resilient reaction and centering device according to the invention;

Figure 18:
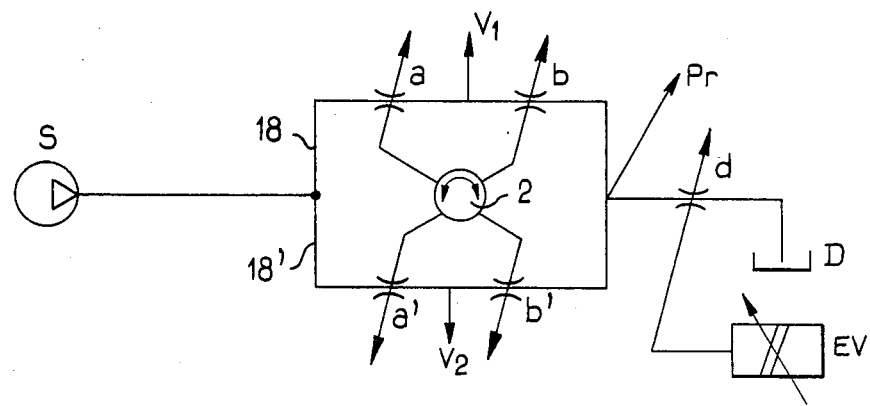
Figure 19:
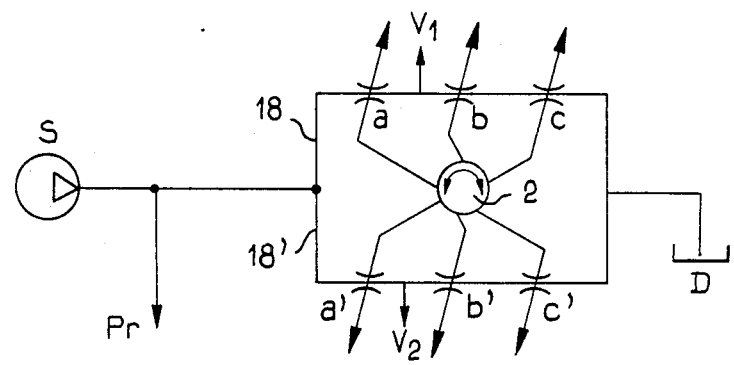
Figure 20:
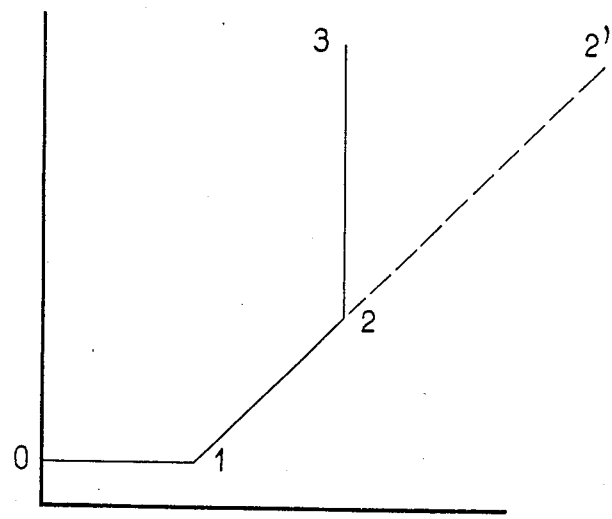

FIGS. 14 to 19 are functional diagrams of a hydraulic distributor according to the invention, showing various alternative methods of obtaining the modulation pressure of the resilient reaction and centering device according to the invention, and FIG. 20 shows the characteristic curve of power assistance pressure plotted against input torque of a hydraulic distributor for a power steering system for vehicles according to the invention.

In the following description and in the drawings identical or similar members are given the same reference numerals, with superscripts where necessary.

Reference will first be made to FIG. 6, which shows diagrammatically a rotary hydraulic distributor for a power steering system for vehicles. Inside a steering box 1, the distributor contains a primary rotary member 2 intended to be connected to an operating device—in this particular instance a vehicle steering wheel—and a secondary rotary member 3 which is coaxial to the primary member 2, extends as an extension of the latter, and is intended to be connected to a driven mechanism—typically a mechanism controlling the direction of steered wheels, the secondary member 3 being extended to form, for example, a pinion meshing with a rack of a steering mechanism. This rack (not shown) is operatively coupled to a power assistance device 10 in the form of a double-acting jack having two antagonistic chambers $V_1$ and $V_2$. The power assistance jack 10 is controlled by a distribution valve means formed, in the example illustrated, by a star-shaped rotor 11 received for sealing rotational sliding in a complementary discoidal cavity in a stator 12 housed in an internal cavity 13 in the box 1 and constituted by a coaxial assembly of two annular end pieces 14 and 15 together with an annular intermediate piece 16 surrounding the rotor 11, these pieces being joined by bolts 17 parallel to the common axis of the primary member 2 and secondary member 3. The star-shaped rotor 11 is rotationally fastened to an end portion 2' of the primary input member 2. A distribution valve means of this kind, provided with a star-shaped rotor, is described in particular in U.S. Pat. Nos. 4,310,024 and 4,512,238 in the name of the Applicant, the contents of which are assumed to be integrated herein for reference. As is known from these documents, the rotor 11 and the stator 12 mutually define a pair of parallel circuits 18 and 18' between a source S of pressurised fluid and a discharge D, each circuit 18 or 18' being provided with at least two serially disposed variable constrictions a, b or a', b' utilized on the relative displacement of the rotor 11 relative to the stator 12 in order to control the pressure in the chambers $V_1$ or $V_2$ of the power assistance jack 10 (as illustrated diagrammatically in FIGS. 14 to 19).

Figure 1:
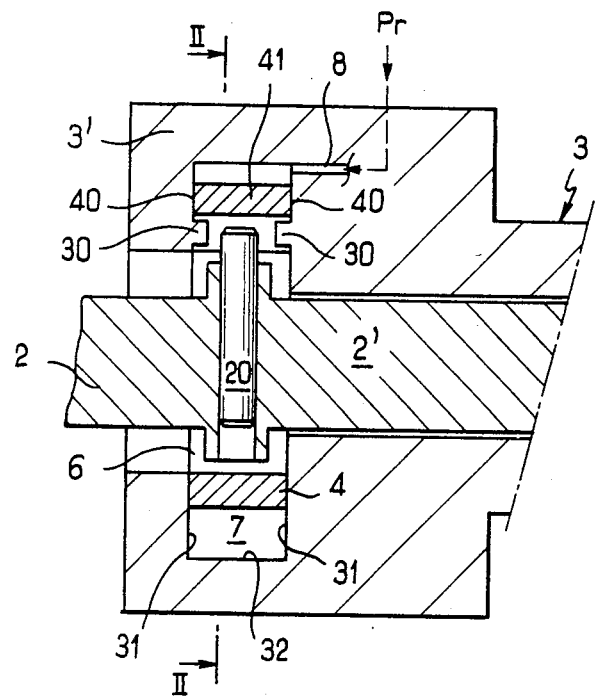
FIG. 1 is a diagrammatical view in longitudinal section of a first embodiment of a resilient reaction and centering device for hydraulic distributors according to the invention.
Figure 2:
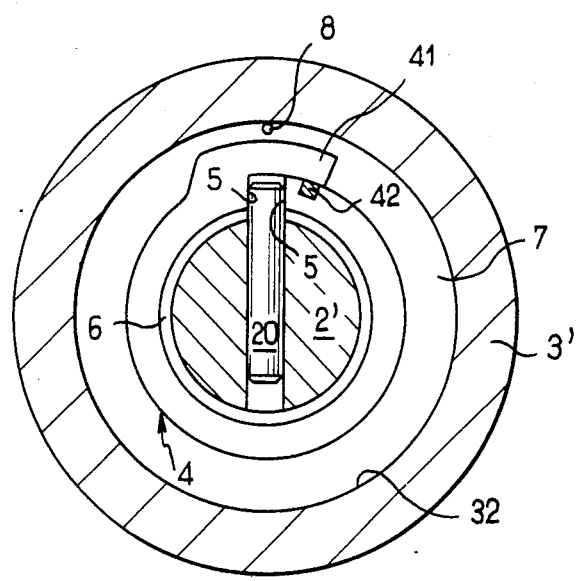
FIG. 2 is a cross-section of view in the sectional plane II—II in FIG. 1.
Figure 14:
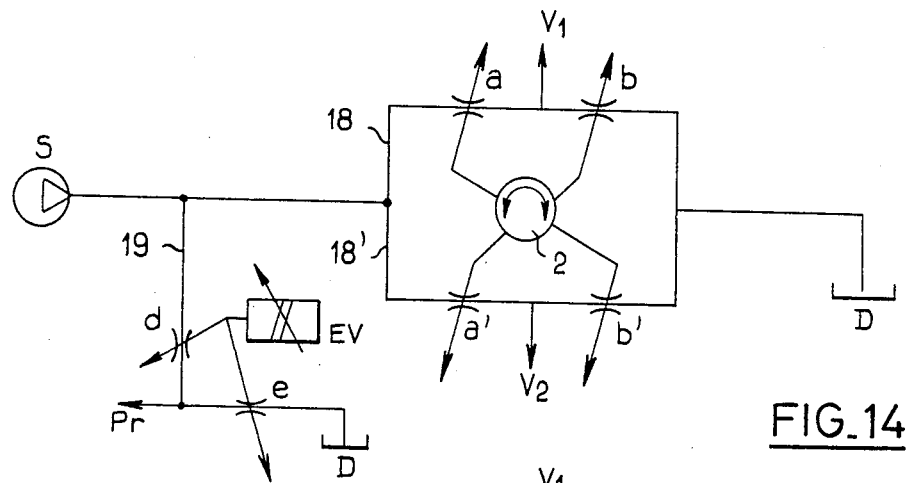
Figure 15:
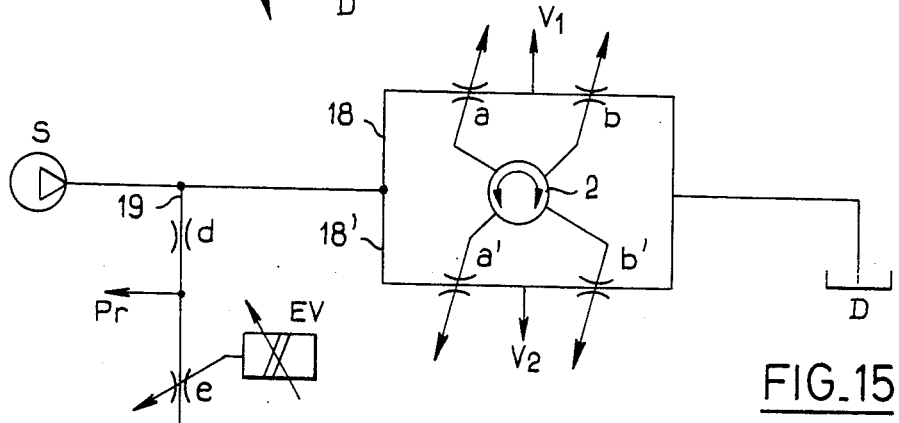

Referring now to FIGS. 1 and 2, the present invention relates to a resilient device, given the general reference 4, which cooperates with the primary member 2 and the secondary member 3 to achieve effective centering in the position of rest of these primary and secondary members (and therefore of the rotor 11 relative to the stator 12) by permitting flexible backlash coupling between these primary and secondary members, while supplying on the primary member 2 a resilient reaction in order to give the driver, in the case of power steering, a sensation of "feel" during the operation of the distributor. According to the invention, a part 3' of the secondary member 3 surrounds at least partially a part 2' of the primary member 2, the deformable resilient device 4 surrounding at least the said part 2' of the primary member.

In the embodiment shown in FIGS. 1 and 2, the resilient device 4 has a general annular C-shape, the mutually facing ends 5 of the branches of the C forming a pair of abutment surfaces cooperating, on the one hand, with the transversely opposite edges of a stud 20 inserted diametrically into the part 2' of the primary member 2, and on the other hand with two projections 30 extending axially towards one another from the axially facing walls 31 of an annular chamber 32 formed in the part 3' of the secondary member 3, the resilient device 4 being disposed in this chamber 32.

According to one aspect of the invention, the resilient device 4 is mounted to slide sealingly by its opposite annular side faces 40 against the parallel trued plane faces 31 of the cavity 32. In the embodiment shown in FIG. 1, one of the ends of the branches of the resilient device 4 has an extended portion 41 offset radially outwards so as to extend, by sliding sealingly, over the periphery of the other end of the device 4, the sealing being ensured by a seal 42 carried by one or the other of these overlapping end parts. In this way, the resilient device 4 bounds in the cavity 32 an internal chamber 6 and an external chamber 7, which are separated from one another and whose volumes are inversely variable when the resilient device 4 undergoes a deformation tending to move the mutually opposite faces 5 towards or away from one another.

According to the invention, a fluid under modulable pressure $P_r$ can be admitted, in the example illustrated, into the external chamber 7 via a passage 8 provided in the part 3' of the secondary member 3. In dependence on the pressure $P_r$ admitted into the chamber 7, it is thus possible to modify the resilient characteristic of the device 4, which is otherwise determined once and for all by its dimensioning, and therefore to modulate the reaction supplied by this resilient device 4, particularly in dependence on parameters connected with the running conditions of the vehicle, the pressure $P_r$ being itself modulated in dependence on these parameters, as will be seen later on.

The embodiment illustrated in FIG. 3 is similar to that shown in FIGS. 1 and 2, with the exception that the resilient device 4 is disposed around the part 3' of the secondary member 3, which is in the form of a tubular extension provided with a first opening 33 and, disposed symmetrically one on each side of the latter, with two openings 34. The cavity 32 housing the resilient device 4 is formed by a member adapted to be displaced rotationally with the secondary member 3, 3' and consisting, for example, of an end piece 15 of the stator 12 of the distribution valve means previously described in connection with FIG. 6. In the embodiment shown in FIG. 3, the mutually opposite faces 5 of the ends of the resilient device 4 cooperate with a radial projection 20' integral with the part 2' of the primary member and extending freely, when at rest, into the first opening 33 in the part 3'. The resilient device 4 cooperates with this part 3' by means of projections 44 extending radially inwards and forming support faces 5' cooperating with those edges of the openings 34, in which the projections 44 are received, which are directed towards the first opening 33.

The embodiment illustrated in FIG. 4 is likewise substantially similar to the embodiments described in connection with FIGS. 2 and 3, with the exception that the end part 41 cooperates overlappingly with an outwardly extending projection 43', forming a lug, on the other end of the resilient device 4. The radial projection 20' of the part 2' cooperates with the mutually opposite support faces 5 of the resilient device 4, whose second support faces 5' are formed by the opposite faces of the lug 43' and of its equivalent forming the connection with the extension 41, these members extending freely through an opening 33 formed in the part 3'. In this embodiment shown in FIG. 4 it will be noted that two adjacent, diametrically inverted resilient devices 4 and 4' are provided, the part 3' being consequently provided with two openings 33 and 33' disposed diametrically opposite one another.

In the embodiment shown in FIG. 5, the resilient device 4 is disposed, as in FIG. 4, around the part 2' of the primary member 2, inside the part 3' of the secondary member 3 defining the cavity 32. The support faces 5 of the resilient device 4 are here formed by the opposite edges of two lugs 43 projecting inwards the received in a longitudinal slot 20" in the part 2' of the primary member. The support faces 5' of the resilient device 4 cooperating with the edges of an opening 34 in the part 3' of the secondary member 3 are formed by a lug 43' extending outwards from the end of the resilient device 4 overlapped by the extension 41 of the other end and the corresponding connection face of the extension 41. In this embodiment the stress exerted on the resilient device 4 by the primary member 2, 2' tends to bring together the two mutually facing ends of the resilient device 4, instead of moving them apart as previously. In consequence, the modulation pressure $P_r$ is here admitted into the internal chamber 6, as indicated by the supply duct 8 in FIG. 5.

In the embodiment shown in FIGS. 6 and 7, as in that shown in FIG. 3, the resilient device 4 is disposed around the part 3' of the secondary member 3, which in turn immediately surrounds the end portion 2' of the primary member 2. The cavity 32 is formed in the end piece 15 of the stator 12, with which is associated, likewise with the aid of bolts 17, an annular extension 150 defining one of the annular walls 31 of the cavity 32. As in the embodiment shown in FIG. 5, the support faces 5 of the resilient device 4 and the part 2' are formed by lugs 43 extending inwards and received in a longitudinal groove 20" in the part 2', these lugs 43 likewise extending through an opening 34 in the part 3' in order to form the support faces 5' in the extension of the support faces 5. Here also the modulation pressure $P_r$ is introduced into the internal chamber 6 through the passage 8. In FIGS. 6 and 7 it will be noted that two adjacent, diametrically inverted resilient devices 4 and 4' are provided, as in the embodiment shown in FIG. 4.

The rotor 11 of the distribution valve means being rotationally coupled to the end part 2' of the primary member 2, the cooperation between this part 2' and the resilient device 4 can be effected as an alternative, as illustrated in FIGS. 8 and 9, by means of one of the arms 110 extending radially outwards from the rotor 11. Thus, as shown in FIG. 8, the resilient device 4 can be disposed around the rotor 11, inside the annular intermediate member 16 of the stator, the support faces 5 cooperating with the outer edges of the arm 110 and the extensions 41 cooperating, by sliding sealingly, with the outer periphery of the arm 110, which advantageously carries seals 42. The mutually facing ends of the extensions 41 form the support faces 5' cooperating with the opposite side faces of a projection 160 of the part 16, projecting radially inwards; the reaction modulation pressure $P_r$ is admitted through the passage 8 into the annular space forming the chamber 7 between the outer periphery of the resilient device 4 and the inner periphery of the part 16.

As an alternative, as illustrated in FIG. 9, the support faces 5 of the resilient device may be formed by lugs 43 extending inwards on the resilient device 4, in order to cooperate respectively with the external facing edges of two adjacent radial arms 110 on the rotor 11. The edges of the lugs 43 forming the support faces 5 also form the support faces 5' cooperating with studs 151 which are fastened to the stator 12 and extend axially between the outer peripheral edges of the arms 110 and the inner surface of the resilient device 4, the reaction modulation pressure $P_r$ being admitted through the passage 8 into the inner chamber 6.

In the embodiment illustrated in FIGS. 10 and 11, which are in many respects similar to that shown in FIGS. 1 and 2, the resilient device 4 is in the form of a closed annular structure having two pairs of internal arms 44, which are of substantially semicircular configuration and whose facing ends form the support surfaces 5 (and 5') cooperating with the stud 20 diametrically passing completely through the part 2', and with the projections 30 on the faces 31 of the cavity 32. The inner cavity 6 is thus entirely defined in the resilient device 4, essentially between the arms 44 and the peripheral junction zones 45. As in the embodiment shown in FIGS. 1 and 2, the reaction modulation pressure $P_r$ is admitted through the passage 8 into the external chamber 7 defined in the cavity 32.

The embodiment shown in FIGS. 12 and 13 is similar to that shown in FIGS. 1 and 2, with the exception that the resilient device is here formed by two symmetrical subassemblies $4_1$ and $4_2$, the extension of one of them ($41_1$ or $41_2$) cooperating, by sealingly sliding, with the end of the other ($4_2$ or $4_1$). The assembly and the resilient character of the device constituted by the two subassemblies $4_1$ and $4_2$ are achieved by means of diametrically opposite springs 45, each of which is supported in mutually facing cavities formed in the central portion of the corresponding subassembly and in the inner peripheral face of the part 3'. The modulation pressure $P_r$ is introduced through the passage 8 into the outer chamber 7.

Figure 16:
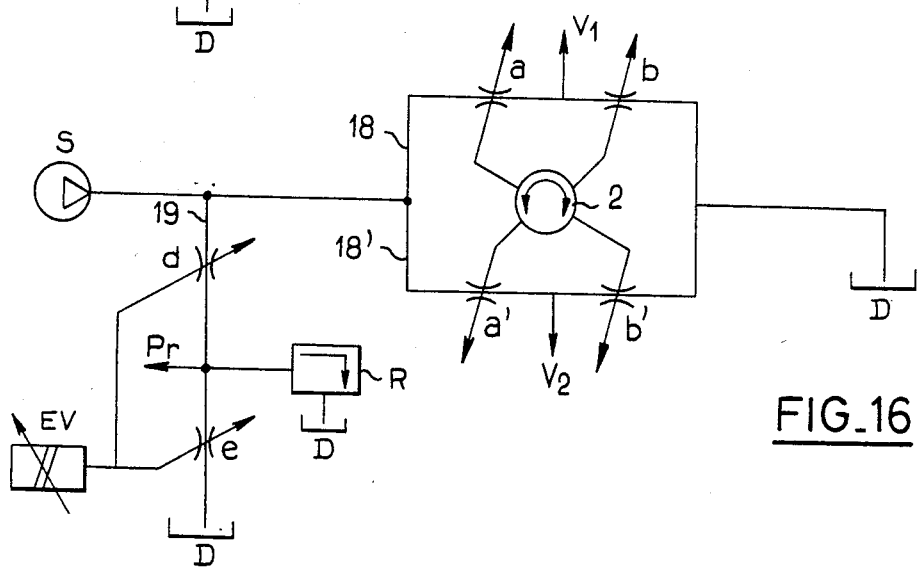

FIGS. 14 to 19 show various functional diagrams making it possible to supply the modulated reaction pressure $P_r$. In the embodiment shown in FIG. 14, the reaction pressure $P_r$ is taken from a branch 19 between the source S and the discharge D (upstream of the distributor), between two variable constrictions d and e operated simultaneously in opposite directions by an electromagnetic actuator EV, which in turn is controlled by signals originating from the computer on board the vehicle. In the embodiment shown in FIG. 15, the upstream constriction d of the branch 19 is fixed, only the downstream constriction e being modulated by the actuator EV. The embodiment shown in FIG. 16 is identical to that shown in FIG. 14 with the exception that there is provided in the branch 19, at the level of the intake of the pressure $P_r$, a pressure limiter valve R having a calibrated spring limiting the reaction pressure (and therefore the reaction torque) to a determined maximum value, this limitation corresponding to the portion 2-3 of the characteristic curve shown in FIG. 20.

Figure 17:
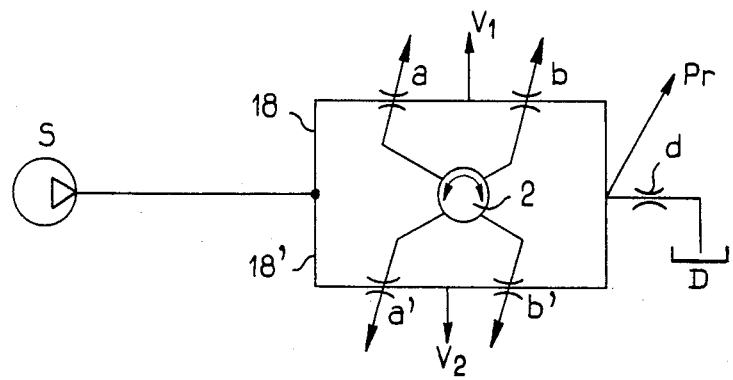

FIGS. 17 to 19 show other alternative embodiments, which in addition make it possible to determine the hydraulic centre point of the distributor (that is to say the portion 0-1 of the characteristic curve in FIG. 20). In the case of FIG. 17 the reaction pressure $P_r$ is taken at the outlet of the distributor (downstream of the circuits 18 and 18'), a fixed constriction d being provided in the return line to the discharge D. In the case of FIG. 18, the downstream constriction d can be modulated by an electromagnetic actuator EV, as in the embodiment shown in FIG. 15. In order to eliminate the problem due to the presence of a permanent constriction d downstream of the distributor, the latter can be arranged as shown in FIG. 19, so as to have in each parallel circuit 18, 18', upstream of the variable constrictions a, b or a', b', a third variable constriction c or c' likewise operated by the primary member 2 of the distributor, the reaction pressure $P_r$ being taken upstream of the latter. The constrictions a, b, c and a', b', c' are determined in such a manner that, in one direction of rotation of the primary member 2, the constrictions b and c' come into action first, after which the constriction a comes into action (b' and c, and then a', in the other direction of operation).

I claim:

1. A rotary hydraulic distributor comprising a primary rotary member intended to be connected to an operating device, a secondary rotary member coaxial with the primaryr rotary member and intended to be connected to a driven mechanism, distribution valve means coupled to the primary rotary member and intended to control a hydraulic power assistance motor of the driven mechanism in dependence on a limited relative angular displacement between the primary and secondary rotary members, a part of the secondary rotary member at least partially surrounding a part of the primary rotary member, at least one deformable resilient device having a substantially closed annular general configuration, surrounding at least the primary rotary member at the part of the latter, and having at least one pair of abutment surfaces (5, 5') cooperating with first and second connection members connected respectively to the primary and secondary rotary members in order to hold them in the relative centered position of rest, characterized in that the resilient device is mounted so as to be sealingly slidable by its opposite annular side faces in an annular cavity formed in a member rotationally fixed to the secondary rotary member, concentrically to the latter, and is shaped so as to define in that cavity an internal chamber and an external chamber which are separate and whose volumes are inversely variable, and in that the distributor comprises means for guiding a fluid under modulable pressure ($P_r$) into at least one of the chambers.

2. The distributor according to claim 1, characterized in that the resilient device is constituted by a cylindrical spring structure having a closed C-shape, whose end zones overlap angularly with the interposition of a sliding seal.

3. The distributor according to claim 1, characterized in that the resilient device is composed of of two symmetrical, substantially semicircular parts sealingly and overlappingly imbricated by their adjacent end zones and resiliently urged towards one another in order to form a deformable ring by diametrically opposite springs disposed between a central zone of each part and an adjacent peripheral wall of the annular cavity.

4. The distributor according to claim 1, characterized in that the resilient device is composed of a closed annular resilient structure having internal arms of substantially semicircular configuration, forming the abutment surfaces.

5. The distributor according to claim 1, characterized in that the resilient device is composed of a cylindrical C-shaped spring structure whose mutually facing end zones cooperate, by sealingly sliding, with the first connection member.

6. The distributor according to claim 1, characterised in that the first connection member has a part projecting radially outwards, fastened to the primary rotary member, and received between mutually facing support surfaces forming the pair of abutment surfaces of the resilient device.

7. The distributor according to claim 6, characterized in that the second connection member has at least one projection projecting axially into the cavity, fastened to the member defining this cavity, and received between the mutually facing support surfaces of the resilient device.

8. The distributor according to claim 6, characterized in that the abutment surfaces are formed by lugs on end zones of the resilient device, which extend outwards and are received in an opening in the part of the secondary rotary member surrounding the primary rotary member in order to form a second pair of opposite abutment surfaces.

9. The distributor according to claim 2, characterised in that the first connection member has a part fastened to the primary rotary member and having on its periphery at least one internal cutout, the end zones of the resilient device being provided with lugs extending at least radially inwards, received in the cutout and forming opposite support surfaces constituting the pair of abutments of the resilient device.

10. The distributor according to claim 9, characterized in that the lugs of the end zones of the resilient device extend into an opening of the part of the secondary rotary member surrounding the primary rotary member and form a second pair of opposite abutment surfaces of the resilient device.

11. The distributor according to claim 5, containing valve means of the star-shaped type with a disc-shaped rotor having radial arms, rotationally coupled to the primary rotary member and received in a discoidal cavity in a stator rotationally coupled to the secondary rotary member, characterized in that the first connection member is composed of at least one arm of the rotor.

12. The distributor according to claim 1, characterised in that the distributor comprises two diametrically inverted adjacent resilient devices.

13. The distributor according to claim 1, characterised in that the distributor contains separate controllable means for modulating the pressure (Pr) directed into the chamber.

14. The distributor according to claim 1, characterised in that the distribution valve means is arranged for selectively modulating the pressure directed into the chamber.

* * * * *